United States Patent Office 3,359,300
Patented Dec. 19, 1967

3,359,300
CARBAMATES OF 1-BENZOCYCLO-
BUTENYL AMINES
Joseph A. Skorcz, Milwaukee, Wis., assignor to Colgate-
Palmolive, Company, New York, N.Y., a corporation
of Delaware
No Drawing. Filed Aug. 7, 1964, Ser. No. 388,262
6 Claims. (Cl. 260—471)

ABSTRACT OF THE DISCLOSURE

The compounds are carbamates of 1-benzocyclobutenyl amines useful as central nervous system stimulant, analgetic and skeletal muscle relaxant agents. A specific compound disclosed is N-(1-benzocyclobutenyl)ethyl carbamate.

This invention relates to derivatives of benzocyclobutene. More particularly, this invention is concerned with novel carbamates derivatives of 1-benzocyclobutenyl amines.

According to the present invention, there are provided novel 1-benzocyclobutenyl carbamates, and 1-benzocyclobutenyllalkyl carbamates, of the formula.

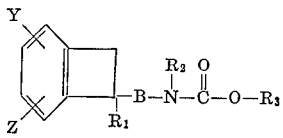

in which Y and Z represent hydrogen, hydroxyl, a lower alkoxy group such as methoxy, ethoxy and propoxy, a lower thioalkyl group such as thiomethyl and thioethyl, methylenedioxy and a halo-lower alkyl such as trifluoromethyl, B is a single chemical bond or a straight or branched lower alkylene, $R_1$ is hydrogen, a lower alkyl group such as methyl, ethyl and propyl, a cycloalkyl such as those having 3 to 7 carbons in the ring including cyclopropyl, cyclopentyl and cyclohexyl or an aralkyl such as a phenyl-lower alkyl like benzyl and phenethyl, $R_2$ is hydrogen, a lower alkyl group such as methyl, ethyl, propyl and isopropyl, an aryl group including substituted aryl groups such as phenyl, lower alkoxy-phenyl such as p-methoxyphenyl and methylenedioxyphenyl, aralkyl groups such as phenyl-lower alkyl and substituted phenyl-lower alkyl including benzyl, phenethyl and p-methoxyphenethyl and cycloalkyl groups particularly those having 3 to 7 carbons in the ring including cyclopropyl, cyclopentyl and cyclohexyl, and $R_3$ is a lower alkyl group such as methyl, ethyl, propyl, isopropyl and butyl, a cycloalkyl group such as those having 3 to 7 carbons in the ring including cyclopropyl, cyclopentyl, cyclohexyl and cycloheptyl, an aryl group including substituted aryl groups such as phenyl, lower alkoxy-phenyl such as p-methoxyphenyl and methylenedioxyphenyl, and aralkyls such as phenyl-lower alkyl and substituted phenyl-lower alkyl including benzyl, phenethyl and p-methoxyphenethyl.

The carbamates of this invention can be produced by reacting a benzocyclobutenyl amine with an appropriately substituted haloformate. This process can be represented as follows:

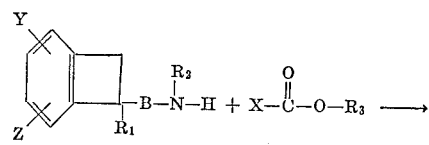

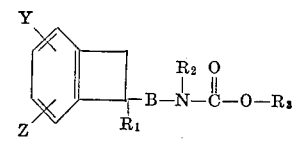

wherein X is a reactive halo group and particularly is chloro, and Y, Z, B, $R_1$, $R_2$ and $R_3$ have the significance previously assigned.

Benzocyclobutenyl amines among those which can be used in the process are disclosed in the United States patent application of Robertson and Skorcz, Ser. No. 388,299, filed Aug. 7, 1964, and Horner et al., Ber., 91, 430 (1958). Specific amines which can be used are:

1-aminobenzocyclobutenylamine,
1-aminomethyl-benzocyclobutene,
N-methyl-1-aminomethyl-benzocyclobutene,
1-aminomethyl-5-methoxybenzocyclobutene,
1-aminomethyl-1-benzyl-benzocyclobutene,
1-(1-aminoethyl)-benzocyclobutene,
1-(2-aminoethyl)-benzocyclobutene,
1-(2-aminopropyl)-benzocyclobutene,
1-aminomethyl-3-methyl-benzocyclobutene,
1-(2-aminoethyl)-6-methoxy-benzocyclobutene,
1-aminomethyl-4,5-methylenedioxy-benzocyclobutene,
1-(1-aminoethyl)-6-trifluoromethyl-benzocyclobutene,
1-aminomethyl-1-methyl-benzocyclobutene,
1-(2-aminoethyl)-1-benzyl-3-methoxy-benzocyclobutene,
1-(3-aminopropyl)-1-cyclohexylmethyl-benzocyclobutene,
N-ethyl-1-aminoethyl-benzocyclobutene,
N-propyl-1-(2-aminoethyl)-benzocyclobutene,
N-phenyl-1-aminomethyl-benzocyclobutene,
N-benzyl-1-aminoethyl-benzocyclobutene,
N-cyclohexyl-1-aminoethyl-benzocyclobutene,
N-methyl-1-aminomethyl-1-methyl-benzocyclobutene,
N-methyl-1-aminomethyl-3-methoxy-benzocyclobutene, and
N-benzyl-1-aminomethyl-1-benzyl-3-methoxy-benzocyclobutene.

Some of the substituted haloformates which can be used as reactants are methyl chloroformate, ethyl chloroformate, propyl chloroformate, cyclopropyl chloroformate, cyclopentyl chloroformate, cyclohexyl chloroformate, phenyl chloroformate, p-methoxyphenyl chloroformate, benzyl chloroformate, phenylethyl chloroformate and 3,4-methylenedioxybenzyl chloroformate.

The reaction of the benzocyclobutenyl amine with the haloformate can be readily effected by combining the reactants in a suitable liquid reaction medium such as carbon tetrachloride, chloroform, ethylene dichloride, benzene, xylene, toluene, acetone and pyridine. A basic hydrogen halide acceptor is advisably included in the reaction mixture to neutralize the released hydrogen halide. Triethylamine, pyridine and other basic materials may be used for this purpose. The reaction is generally readily effected at room temperature although higher or lower temperatures are sometimes found more satisfactory. Following the reaction the mixture can be diluted with water and the desired carbamate isolated by distillation when an oil, or filtration when a solid.

Some of the carbamates of this invention which can be produced as described are:

N-(1-benzocyclobutenyl) methyl carbamate,
N-(1-benzocyclobutenyl) propyl carbamate,
N-[1-(4-methoxybenzocyclobutenyl)] phenyl carbamate,
N-(1-benzocyclobutenyl) benzyl carbamate,
N-(1-benzocyclobutenyl) cyclohexyl carbamate,
N-[1-(1-methylbenzocyclobutenyl)] ethyl carbamate,
N-methyl-N-(1-benzocyclobutenyl) propyl carbamate,
N-benzyl-N-(1-benzocyclobutenyl) phenyl carbamate,
N-ethyl-N-[2-(1-benzocyclobutenyl)-ethyl] methyl carbamate,
N-[1-(1-benzocyclobutenyl)-methyl] benzyl carbamate,
N-[3-(1-methyl-1-benzocyclobutenyl)-propyl] cyclopentyl carbamate,
N-cyclohexyl-N-[1-(1-phenyl-1-benzocyclobutenyl)-methyl] ethyl carbamate,
N-phenyl-N-[2-(1-cyclopentyl-1-benzocyclobutenyl)-ethyl] methyl carbamate, and
N-[3-(1-benzyl-1-benzocyclobutenyl)-propyl] methyl carbamate.

The carbamates provided herewith have sympathomimetic activity. They exert central nervous system stimulation, analgetic activity and skeletal muscle relaxant activity, in animals. The compounds also appear to be anorexogenics, analeptics, pressor agents, monoamine oxidase inhibitors, beta-oxidase inhibitors, and DOPA decarboxylase inhibitors.

The carbamates of this invention may be administered to animals and humans as pure compounds. It is advisable, however, to first combine one or more of the compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc and the like may be used to form powders. The powders may be used as such for direct administration to a patient or, instead, the powders may be added to suitable foods and liquids, including water, to facilitate administration.

The powders may also be used to make tablets, or to fill gelatin capsules. Suitable lubricants like magnesium stearate, binders such as gelatin, and disintegrating agents like sodium carbonate in combination with citric acid may be used to form the tablets.

Unit dosage forms such as tablets and capsules may contain any suitable predetermined amount of one or more of the active agents and may be administered one or more at a time at regular intervals. Such unit dosage forms, however, should generally contain a concentration of 0.1% to 10% by weight of one or more of the active agents. Unit dosage forms should advisably contain about 5 to 150 mg. of the active agents described herein.

A typical tablet may have the composition:

| | Mg. |
|---|---|
| (1) N-(1-benzocyclobutenyl) ethyl carbamate | 10 |
| (2) Starch U.S.P. | 57 |
| (3) Lactose U.S.P. | 73 |
| (4) Talc U.S.P. | 9 |
| (5) Stearic acid | 6 |

Powders 1, 2 and 3 are slugged, then granulated, mixed with 4 and 5, and tableted.

Capsules may be prepared by filling No. 3 hard gelatin capsules with the following ingredients, thoroughly mixed:

| | Mg. |
|---|---|
| (1) N - [1-(1-benzylbenzocyclobutenyl) - methyl] ethyl carbamate | 5 |
| (2) Lactose U.S.P. | 200 |
| (3) Starch U.S.P. | 16 |
| (4) Talc U.S.P. | 8 |

The oral route is preferred for administering the active agents of this invention. However, other modes of administration, such as parenteral, may be employed.

The following examples are presented to illustrate the preparation of the carbamates of this invention.

EXAMPLE 1

*N-(1-benzocyclobutenyl) ethyl carbamate*

A solution of 1-aminobenzocyclobutene hydrochloride (3 g.) and triethylamine (3.9 g.) in 75 ml. of chloroform was cooled in an ice bath and was treated dropwise with 2.1 g. of ethyl chloroformate in 25 ml. of chloroform. The solution was allowed to warm slowly and then was stirred at room temperature for a total of 10 hours. The chloroform solution was washed with water, dried over anhydrous sodium sulfate and evaporated to dryness. Recrystallization of the solid residue from n-hexane afforded the carbamate as a colorless solid, M.P. 75–76.6° C.

*Analysis.*—Calcd. for $C_{11}H_{13}NO_2$: C, 69.09; H, 6.85; N, 7.33. Found: C, 69.27; H, 6.67; N, 7.59.

EXAMPLE 2

*N-[1-(1-benzylbenzocyclobutenyl)-methyl] ethyl carbamate*

A cold solution of 1-aminomethyl-1-benzylbenzocyclobutene hydrochloride (5.7 g.) and triethylamine (4.5 g.) in 100 ml. of chloroform was treated dropwise with 2.4 g. of ethyl chloroformate in 25 ml. of chloroform. The solution was allowed to warm slowly and then was stirred at room temperature for a total of 20 hours. The chloroform solution was shaken with water, dried over anhydrous sodium sulfate and was evaporated to dryness. Distillation of the residual oil afforded the carbamate as a colorless, viscous liquid, B.P. 159–161° C. at 0.07 mm.

*Analysis.*—Calcd. for $C_{19}H_{21}NO_2$: C, 77.26; H, 7.16; N, 4.74. Found: C, 77.37; H, 7.16; N, 4.77.

The foregoing detailed description has been given for clearness of understanding only, and no unnecessary limitations should be understood therefrom, as modifications will be obvious to those skilled in the art.

What is claimed is:

1. A carbamate of the formula

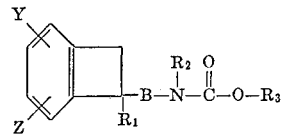

wherein Y and Z represent ring substituents selected from the group consisting of hydrogen, hydroxyl, lower alkoxy, lower thioalkyl, methylenedioxy and halo-lower alkyl, B represents a member selected from the group consisting of a single chemical bond and lower alkylene, $R_1$ represents a member selected from the group consisting of hydrogen, lower alkyl, cycloalkyl, and aralkyl, $R_2$ represents a member selected from the group consisting of hydrogen, lower alkyl, cycloalkyl, aryl and aralkyl and $R_3$ represents a member selected from the group consisting of lower alkyl, cycloalkyl, aryl and aralkyl.

2. A carbamate of the formula

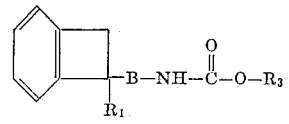

in which $R_1$ and $R_3$ are lower alkyl and B is lower alkylene.

3. N-(1-benzocyclobutenyl) lower alkyl carbamate.
4. N-(1-benzocyclobutenyl) ethyl carbamate.
5. N-[1-(1 - benzylbenzocyclobutenyl)-methyl] ethyl carbamate.
6. A compound of the formula

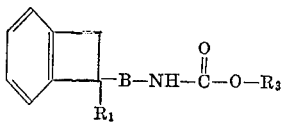

in which $R_1$ is phenyl-lower alkyl, $R_3$ is lower alkyl and B is lower alkylene.

References Cited

UNITED STATES PATENTS 2,934,542   4/1960   Burger _____ 260—340.5

LORRAINE A. WEINBERGER, *Primary Examiner.*

L. ARNOLD THAXTON, *Assistant Examiner.*